(12) United States Patent
Odle

(10) Patent No.: US 11,505,180 B2
(45) Date of Patent: Nov. 22, 2022

(54) ACTIVE ENERGY MANAGEMENT FOR FRONTAL IMPACTS

(71) Applicant: Rivian IP Holdings, LLC, Plymouth, MI (US)

(72) Inventor: Jared Odle, Westland, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 186 days.

(21) Appl. No.: 16/916,658

(22) Filed: Jun. 30, 2020

(65) Prior Publication Data
US 2021/0402990 A1 Dec. 30, 2021

(51) Int. Cl.
*B60W 30/085* (2012.01)
*B62D 21/15* (2006.01)

(52) U.S. Cl.
CPC .......... *B60W 30/085* (2013.01); *B62D 21/15* (2013.01); *B60W 2420/40* (2013.01); *B60W 2420/42* (2013.01); *B60W 2420/52* (2013.01); *B60W 2420/54* (2013.01)

(58) Field of Classification Search
CPC .......... B60W 30/085; B60W 2420/40; B60W 2420/42; B60W 2420/52; B60W 2420/54; B62D 21/15
See application file for complete search history.

(56) References Cited

U.S. PATENT DOCUMENTS

| | | | | |
|---|---|---|---|---|
| 3,822,907 A * | 7/1974 | Appel | .................. | B62D 21/152 293/133 |
| 9,352,711 B2 * | 5/2016 | Hoiss | ...................... | B60R 19/24 |
| 2004/0189024 A1 * | 9/2004 | Lindsey | .................. | B60R 19/40 293/118 |
| 2006/0186702 A1 * | 8/2006 | Kisanuki | ................. | B60R 21/36 701/45 |
| 2007/0032952 A1 * | 2/2007 | Carlstedt | ................... | B60T 7/22 701/45 |
| 2007/0063133 A1 * | 3/2007 | Furuya | .................. | G01S 13/931 250/231.16 |
| 2007/0125589 A1 * | 6/2007 | Murphy | ................ | B60R 21/013 180/274 |
| 2009/0152041 A1 * | 6/2009 | Kim | ........................ | B60R 21/36 180/274 |
| 2011/0172882 A1 * | 7/2011 | Schrader | ................. | B60R 19/54 293/118 |

(Continued)

FOREIGN PATENT DOCUMENTS

| | | | | | |
|---|---|---|---|---|---|
| CN | 101734211 A | * | 6/2010 | | |
| DE | 10011930 A1 | * | 9/2001 | ........... | B60G 17/005 |

(Continued)

*Primary Examiner* — Peter D Nolan
*Assistant Examiner* — Kenneth M Dunne
(74) *Attorney, Agent, or Firm* — Clements Bernard Baratta; Christopher L. Bernard

(57) ABSTRACT

An active impact control system includes: at least one actuator couplable to a crush structure of a vehicle and couplable to a portion of a structure of the vehicle; at least one sensor configured to sense impact with an object; and a controller configured to receive information from the at least one sensor and to determine a location and angle of impact based on the information received from the sensor, the controller being further configured to selectively signal the actuator to cause the crush structure to move relative to the structure of the vehicle.

13 Claims, 6 Drawing Sheets

(56) References Cited

U.S. PATENT DOCUMENTS

| | | | | |
|---|---|---|---|---|
| 2017/0334383 A1* | 11/2017 | Paxton | ................... | B62D 1/197 |
| 2018/0118269 A1* | 5/2018 | Grattan | ................ | B62D 21/152 |
| 2020/0056909 A1* | 2/2020 | Datta Gupta | .......... | G01D 11/02 |

FOREIGN PATENT DOCUMENTS

| | | | | |
|---|---|---|---|---|
| DE | 102010021061 A1 * | 1/2011 | ........... | B62D 21/152 |
| DE | 102011118658 A1 * | 5/2013 | ......... | B60R 21/0134 |
| DE | 102017217026 A1 * | 3/2019 | | |
| DE | 102020200719 A1 * | 7/2021 | | |
| DE | 102020205488 A1 * | 11/2021 | | |
| EP | 0978442 A1 * | 2/2000 | ............ | B62D 21/15 |
| EP | 3205536 A1 * | 8/2017 | | |
| JP | 2008001242 A * | 1/2008 | | |
| KR | 101795414 B1 * | 11/2017 | ............. | G01S 13/87 |
| WO | WO-0168437 A2 * | 9/2001 | ............ | B62D 21/15 |
| WO | WO-2018145928 A1 * | 8/2018 | ............ | B60R 19/34 |

* cited by examiner

ACTIVE ENERGY MANAGEMENT FOR FRONTAL IMPACTS

The present disclosure relates to energy absorption in vehicle impacts.

Crumple zones, crush zones, or crash zones are a structural safety feature used in vehicles, primarily in small trucks and automobiles, to increase the time over which a change in velocity (and consequently momentum) occurs from the impact during a collision by controlled deformation of vehicle structures.

Crush zones are designed to increase the time over which the total force from the change in momentum is applied to an occupant, as the average force applied to the occupants is inversely related to the time over which it is applied.

$$F_{Avg} \Delta t = m \Delta v$$

where F is the force, t is the time, m is the mass, and v is the velocity of the body.

Conventionally, these crush zones are located in the front part of the vehicle in order to absorb the impact of a head-on collision—though they may be found on other parts of the vehicle as well. These crush zones are static structures and sometimes may not be optimized for oblique or off-center impacts because the wheel clearance zone of the vehicle is part of the crush zone and static crush rails must not interfere with wheels in changing angular orientations.

Crush zones on the front of conventional vehicles are static. These static crush zones are not typically designed for oblique off-center impacts. For example, the crush zone may be designed for maximum effectiveness when the impact is not oblique or off-center. Referring now to FIGS. 1, and 2, a conventional automobile 110 is depicted impacting an off-center obstruction 130. In such cases, crashworthiness is compromised because the energy absorbing structure, crush rails 150 and 155, are not aligned with obstruction 130 or the angle of impact with the obstruction 130. In this case, the crush zone is not be well configured for maximum energy absorption. The crush zone depicted includes a bumper 140, and two energy absorbing struts or crush rails 150 and 155. In a frontal impact, the crush zone is designed to absorb much of the impact by crumpling the bumper 140 and the struts 150 and 155. All of these structures may absorb much of the impact energy during the crash such that there is less intrusion, of portions of the vehicle itself or impacted objects, into the operator cabin, thereby helping to protect the cabin occupants.

It is possible to improve vehicle crashworthiness performance during small overlap front impacts by actively deploying a crush structure that better aligns with the obstacle, thereby increasing the efficiency at which energy is absorbed. The system described herein operates in the tire clearance zone, so that no additional vehicle length is required for the system to be effective. This means that impact performance could be improved without lengthening a vehicle's front overhang and may potentially allow the front overhang to be reduced.

If, as illustrated in FIGS. 1 and 2, the impact is off-center, the crush rail 155 may help to absorb some of the impact energy. However, because of the location of the wheel 120 and the clearance necessary for turning the wheel 120 within a clearance zone 125, additional static impact structures are not configured to absorb an oblique impact with the obstruction 130.

Additionally, small overlap crashworthiness regulations are requiring vehicles to improve performance during frontal impacts where only a small portion of the vehicle's energy absorbing crush structure is engaged with an obstacle. There is typically insufficient space to fit significant crush structure along the outboard portion of the front bumper/fascia due to interference with the clearance zone of tires at maximum steering angle. It is in this area where energy absorbing crush structure is most beneficial during small overlap frontal impacts but does not currently exist.

SUMMARY

Various disclosed embodiments include active impact control systems, vehicles with active impact systems, and active impact systems.

In an illustrative embodiment, an active impact control system includes: at least one actuator couplable to a crush structure of a vehicle and couplable to a portion of structure of a vehicle; at least one sensor configured to sense impact with an object; and a controller configured to receive information from the at least one sensor and to determine a location and angle of impact based on the information received from the sensor, the controller being further configured to selectively signal the actuator to cause the crush structure to move relative to the vehicle structure.

In another illustrative embodiment, a vehicle includes: a chassis; at least one wheel coupled to the chassis; a wheel clearance zone formed in the chassis and configured to accommodate the at least one wheel; a crush structure located in the wheel clearance zone and configured to absorb mechanical energy during an impact with an object; and a system including: at least one actuator coupled to the crush structure and coupled to a portion of the vehicle; at least one sensor configured to sense impact with the object; and a controller configured to receive information from the at least one sensor and to determine a location and angle of impact based on the information received from the sensor, the controller being further configured to selectively signal the actuator to cause the crush structure to move relative to the vehicle structure in direction and angle related to the determined location and angle of impact.

In another illustrative embodiment a method includes: determining, by an impact sensor on board a vehicle, that the vehicle will impact an object with a high probability; determining, by a controller, an approximate impact site on the vehicle; determining, by the controller, an approximate impact angle on the vehicle; and deploying, responsive to command of the controller, an actuated crush structure with at least one end of the crush structure proximate the impact site and at an angle approximating the impact angle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

Figure 2:
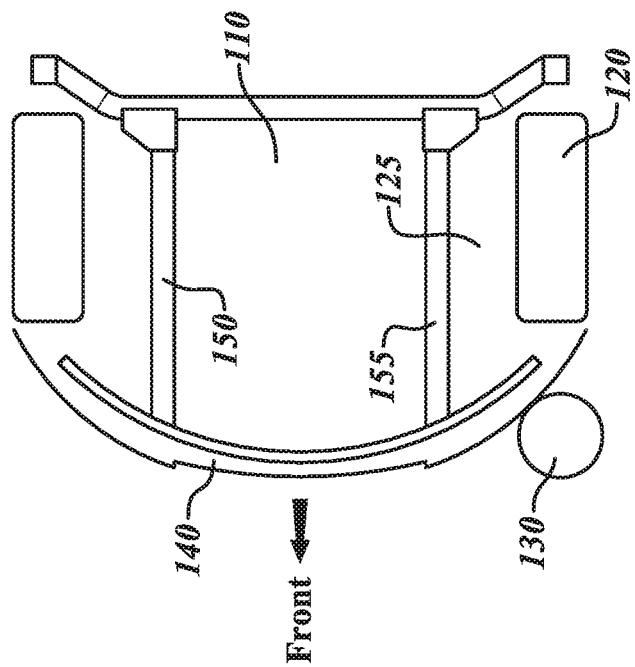
FIG. 2 is a top plan view in cutaway of a crush zone of the conventional vehicle of FIG. 1 impacting an obstruction.
Figure 1:
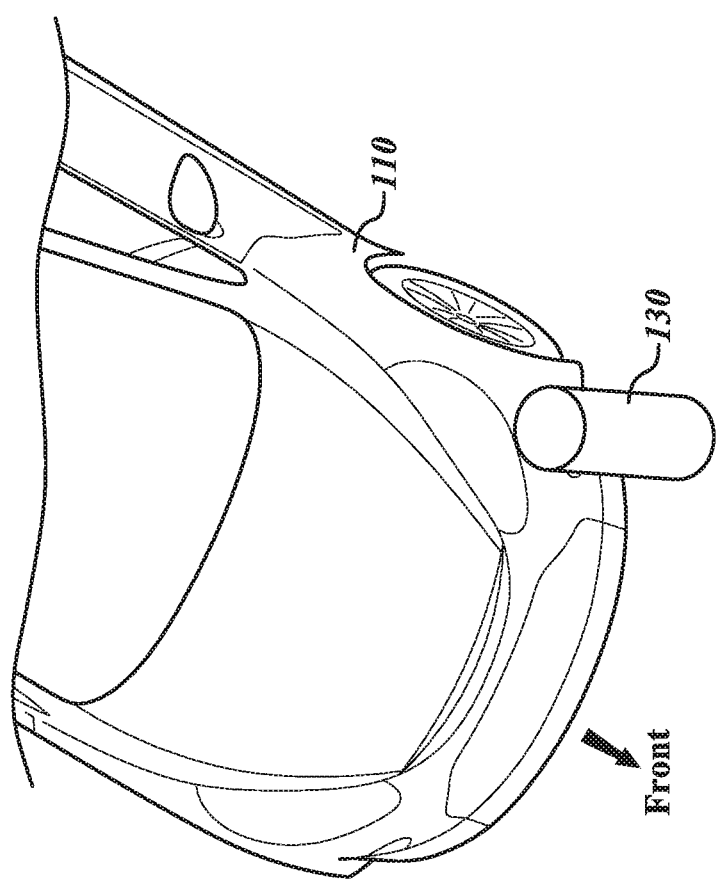
FIG. 1 is a perspective view of the front end of a conventional vehicle impacting an obstruction.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of overview, various disclosed embodiments include active impact systems, vehicles with active impact systems, and methods for operating active impact systems. In various embodiments, an illustrative active impact system may be added to a vehicle's crush structure. As will be described below, various disclosed embodiments can help contribute to: helping to cause a vehicle's crush structure to move; helping to actively align a vehicle's crush structure to better engage with an obstacle under certain conditions during a small overlap frontal impact; and/or helping to enhance impact protection.

Now that an overview has been given, details of illustrative embodiments will be set forth below by way of illustration only and not of limitation.

Figure 3:
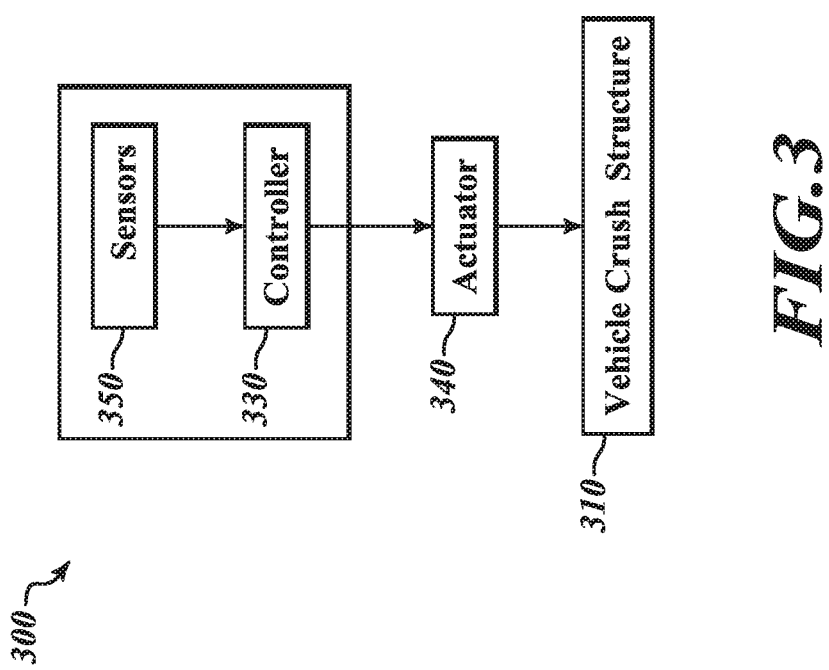
FIG. 3 is a block diagram of an illustrative active impact control system.

Referring now to FIG. 3, an illustrative embodiment includes an active impact control system 300 helps aid in aligning the vehicle crush structure 310 with an obstacle should an impact be imminent. In various embodiments, the active impact control system 300 includes at least one actuator 340 couplable to a crush structure 310 of a vehicle (not shown) and couplable to a portion of structure (not shown) of a vehicle. At least one sensor 350 is configured to sense impact with the object. A controller 330 is configured to receive information from the at least one sensor and to determine a location and angle of impact based on the information received from the sensor, the controller being further configured to selectively signal the actuator to cause the crush structure to move relative to the vehicle structure.

Figure 6:
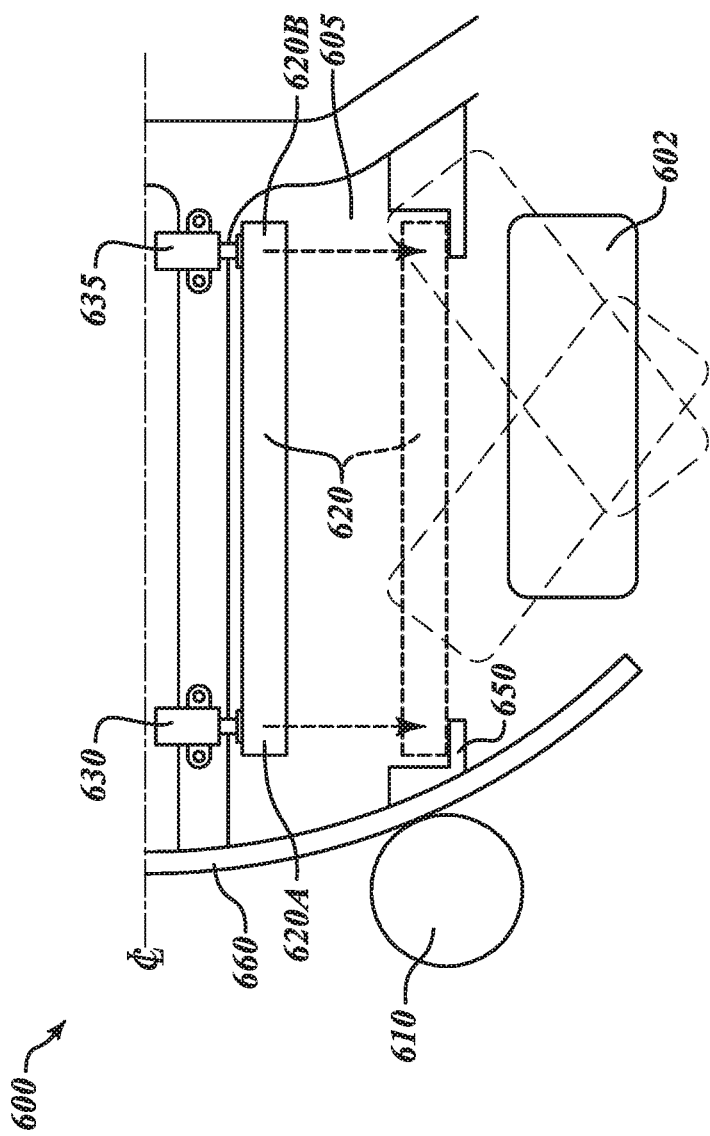
FIG. 6 is a block diagram of another illustrative active impact system.

In various embodiments and as mentioned above, at least one actuator 340 is couplable to the crush structure 310 of the vehicle and is further couplable to a portion of the structure of the vehicle. The actuators 340 cause the vehicle crush structure 310 to move—such as by rotating, translating, or a combination thereof—responsive to the controller 330. In some embodiments and as shown in FIG. 6, a first actuator 630 is coupled proximate one end 620A of the crush structure 620 and a second actuator 635 is coupled proximate the other end 620B of the crush structure 620. Actuators 630 and 635 may be any of a variety of actuators that cause movement of ends 620A and 620B of crush structure 620. The variety of actuators include but are not limited to hydrauklic actuators, pneumatic actuators, electromechanical actuators, etc.

In various embodiments and as mentioned above, at least one sensor 350 is configured to sense impact with the object. The active impact control system 300 uses one or more of the sensors 350 to help determine whether an impact is imminent. The sensors 350 are configured to communicate with the controller 330 and are configured to detect the lateral position of the obstacle relative to the front bumper or fascia and the angle at which the front bumper will impact the obstacle.

In some embodiments, the at least one sensor 350 may include a LIDAR sensor and/or a RADAR sensor. In some other embodiments, the at least one sensor 350 may include an ultrasonic sensor, an infrared sensor, and/or a radiofrequency (RF) sensor. In some other embodiments, the at least one sensor 350 may include a camera sensor. However, it will be appreciated that the sensors 350 may include any of a variety of sensors selected as appropriate for a desired application.

In various embodiments, the controller 330 determines if conditions are appropriate to deploy the vehicle crush structure 310 and, if so, signals the actuators 340 to do so. As mentioned above, the actuators 340 in turn cause the vehicle crush structure 310 to move—such as by rotating, translating, or a combination thereof.

In various embodiments and as mentioned above, the controller 330 is configured to receive information from the at least one sensor 350 and to determine a location and angle of impact based on the information received from the sensor 350, the controller 330 being further configured to selectively signal the actuator 340 to cause the crush structure 310 to move relative to the vehicle structure. In some embodiments, the controller 330 may be further configured to determine an approximate angle of impact with the object. Determining the angle of impact may be done in a variety of ways including using more than one sensor to determine rate of change the distance between each sensor and the object. From that information from each sensor, the angle of impact can be determined.

Figure 5:
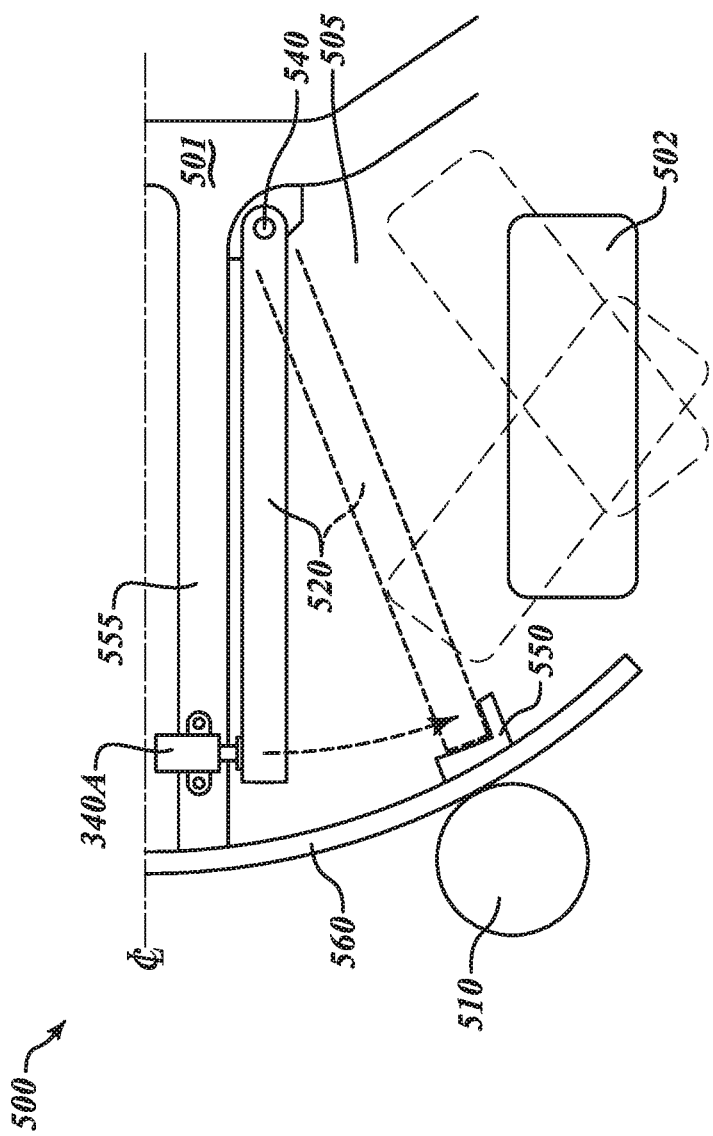
FIG. 5 is a block diagram of an illustrative active impact system.

In some embodiments, the controller 330 may be further configured to determine an approximate angle of impact with the object and to cause the crush structure 310 to approximately axially align with angle of impact as can be seen in FIGS. 5 and 6.

In some embodiments, the controller 330 may be further configured to determine an approximate location of impact on the vehicle. The location of impact may be determined from the sensor information which may provide angle of impact as described above and the sensors also may provide the location of the impact to the controller 330.

In some embodiments, the controller 330 may be further configured to determine an approximate location of impact on the vehicle and to cause one end of the crush structure 310 to move proximate the approximate location on the vehicle. Sensor 350 may be representative of one or more sensors which, m ay be used to sense the rate of change of the distance between the front bumper and object.

The controller 330 may be any of a variety of controllers including but not limited to any of a variety of microprocessor based controllers, ASICs, and the like.

Figure 4:
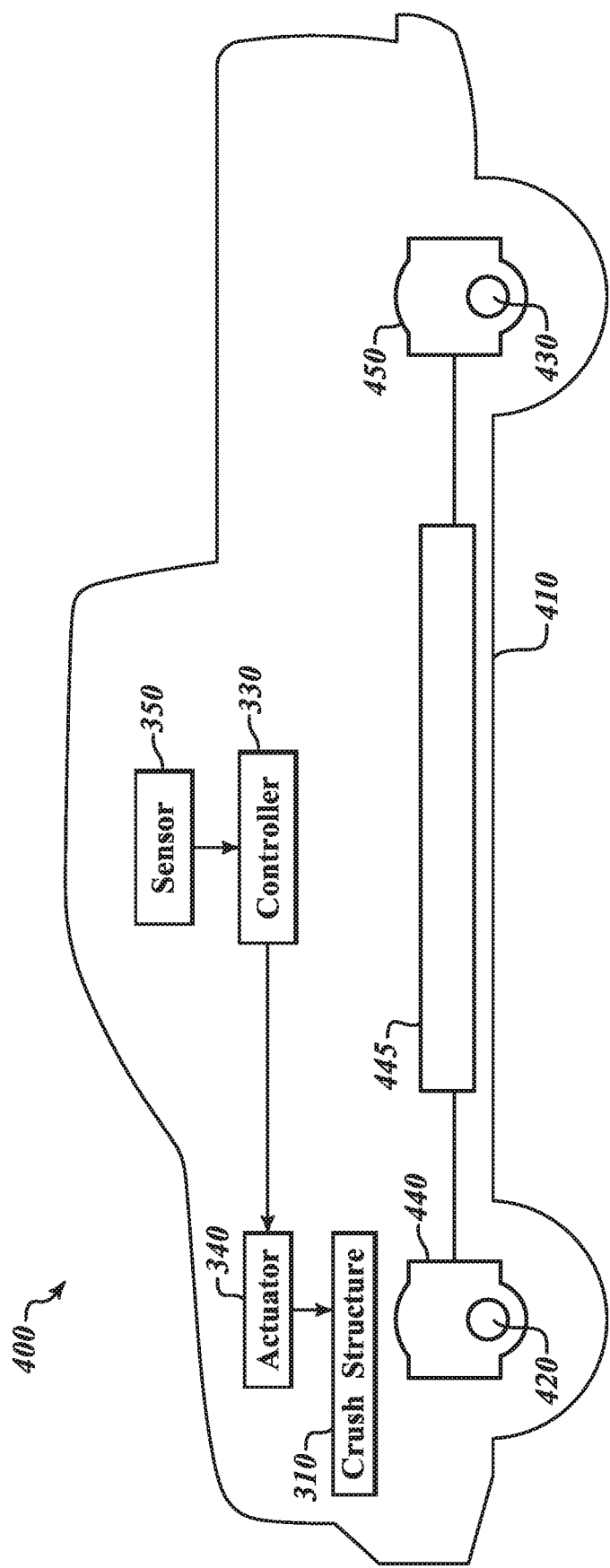
FIG. 4 is a perspective view in partial schematic form of an illustrative vehicle with an active impact system.

Referring now to FIG. 4, in various embodiments an illustrative vehicle includes the system 300. It will be appreciated that the vehicle 400 is representative of any type of vehicle, including but not limited to electric vehicles, plugin electric vehicles, hybrid vehicles, cars, trucks, vans, sports utility vehicles (SUVs), busses, trains, and the like. The vehicle 400 may be operated by an operator who may be fully or partially operating the vehicle or may be without an operator of a fully autonomous vehicle.

The vehicle 400 may include but is not limited to a structure having a chassis 410 and one or more motors, such as but not limited to electric motors 440 and 450 that are couplable to drive axles 420 and 430 respectively. In some embodiments, the motors 440 and 450 may be electric drive motors with power provided from a battery 445.

In various embodiments the vehicle 400 includes a crush structure 310. In such embodiments the crush structure which may include an active crush structure as depicted in FIG. 3.

In various embodiments the vehicle 400 includes the active impact control system 300. The illustrative active impact control system 300 (including the sensor 350, the controller 330, and the actuator 340) have been described above. It will be appreciated that repeating details of their construction and operation is not necessary for an understanding of disclosed subject matter (including the vehicle 400 and also as described with reference to embodiments shown in FIGS. 5 and 6).

Referring additionally to FIG. 5, an illustrative embodiment such as active impact system 500, as depicted in FIG. 5, actively aligns a vehicle's energy absorbing crush structure to better engage with an obstacle (obstruction) 410 under certain conditions during a small overlap frontal impact. In accordance with an illustrative embodiment, active impact system 500 is disposed in a wheel clearance zone 505 that is formed in a chassis of a vehicle to accommodate a steerable wheel such as wheel 502. Wheel clearance zone 505 is formed in a portion of chassis 501 similar to the wheel clearance zone 125 of conventional automobile (vehicle) 110 however in accordance with an illustrative embodiment may also house mechanical parts of active impact system 500.

The mechanical system is composed of a deployable crush structure 520 configured to engage with obstacle 510. An actuator 530 is configured to rapidly deploy crush structure 520 when commanded by a logic controller. Actuator 530 may be any of a variety of actuators including but not limited to electromechanical, electromagnetic, pneumatic, hydraulic actuators, or the like. In operation actuator 530 causes crush structure 520 to rotate about pivot joint 540 thereby causing crush structure 520 to approximately align with obstruction 510, just prior to impacting obstruction 510. This alignment allows crush structure 520 to absorb more of the impact energy than would otherwise be absorbed. In an illustrative embodiment, a stop 550 is positioned on bumper 560. Stop 550 prevents actuated crush structure 520 to be limited in its rotation about pivot 540.

Referring again to FIGS. 3 and 5, crush structure 520, which may be a part of active impact system 300, is configured to absorb mechanical energy during an impact with crush structure 520. At least one actuator 530 is coupled to crush structure 520 and is coupled to a portion of the vehicle structure, such as but not limited to a static crush rail 555. At least one sensor 550 is configured to sense impact with an object or obstruction 510. Controller 330 receives information from at least one sensor 350 and determines a location and angle of impact with obstruction 510 based on sensor 350 information. Controller 330 selectively signals actuator 530 to cause crush structure 520 to move relative to the vehicle structure thereby allowing crush structure 520 to absorb a greater amount of the impact energy. In an illustrative embodiment, pivot 540 is coupled to one end of crush structure 520 and actuator 530 is coupled proximate the other end of the crush structure. This allows controlled rotation of crush structure 520 about pivot 540 to create better axial alignment of crush structure 520 with obstruction 510 or to better align crush structure 520 with an angle of impact which is determined by controller 330 having information from sensors 350.

In accordance with an illustrative embodiment, a vehicle chassis 501 includes at least one wheel 502 coupled to chassis 501 and located at least partially within a wheel clearance zone 505. Mechanical parts of active impact system 500 may be located within or adjacent wheel clearance zone 505. Mechanical parts of active impact system 500 may include but are not limited to crush structure 520 configured to absorb mechanical energy during an impact with the vehicle. At least one actuator 530 may be coupled to crush structure 520 and coupled to a portion of the vehicle chassis 501 at, for example, pivot 540. At least one sensor, such as obstacle sensors 350 may be configured to sense impact with an object, such as but not limited to the illustrative object obstruction 510. A controller, such as illustrative controller 330 receives information from the at least one sensors 350 and determines a location and angle of impact of the vehicle with obstruction 510 based on the sensor information. Controller 330 selectively signals actuator 530 to cause crush structure 520 to move relative to vehicle structure 501 in direction and angle related to the determined location and angle of impact.

In accordance with another illustrative embodiment, an active impact system 600, as depicted in FIG. 6, also actively aligns a vehicle's energy absorbing crush structure to better engage with an obstacle (obstruction) 610 under certain conditions during a small overlap frontal impact. The mechanical system is composed of a deployable crush structure 620 configured to engage with or near obstacle 610. Active impact system 600 includes a first actuator 630 and a second actuator 635 that are configured to rapidly deploy crush structure 620 when commanded by a logic controller, such as controller 330. Actuator 630 may be any of a variety of actuators including but not limited to electromechanical, electromagnetic, pneumatic, hydraulic actuators, or the like and may be controlled independently such that crush structure 620 may be deployed at a variety of translations and angles. In operation actuators 630 and 635 causes crush structure 620 to translate, rotate, or a combination of translate and rotate thereby causing crush structure 620 to approximately align with obstruction 610 and with the angle at which the impact occurs, just prior to impacting obstruction 610. This alignment allows crush structure 620 to absorb more of the impact energy than would otherwise be absorbed without an active impact structure. In an illustrative embodiment, a first stop 650 is positioned on bumper 660 and a second stop 655 is positioned on automotive frame 670. Stops 650 and 655 prevent actuated crush structure 620 to be limited in its rotation and translation.

Figure 7:
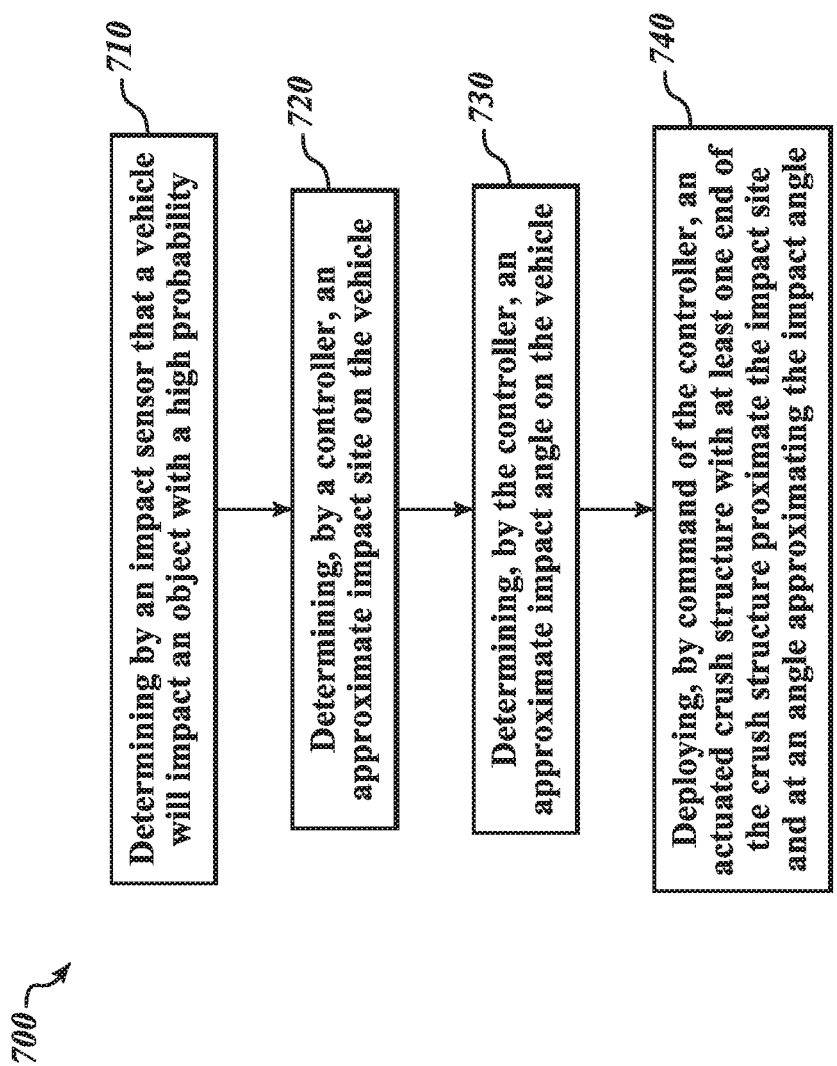
FIG. 7 is a flowchart of a method of operating an active impact system.

Referring now to FIG. 7, an illustrative method 700 of enhancing impact protection is depicted. At a block 710 an impact sensor on board a vehicle determines that the vehicle will impact an object with a high probability. In operation, the electronic sensor system on board the vehicle detects that an impact is about to occur through sensor data and vehicle modelling. At a block 720, a controller then determines an approximate impact site on the vehicle by using the sensor data and the modelling information. At a block 730, the controller then determines an approximate impact angle on the vehicle also by applying the sensor data and the modelling information. Finally, at a block 740 prior to impact the controller commands deployment of the actuated crush structure with at least one end of the crush structure proximate the impact site and at an angle approximating the impact angle.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An active impact control system comprising:
at least one actuator couplable to a crush structure of a vehicle and couplable to a portion of a structure of a vehicle, wherein the crush structure is located in a wheel clearance zone formed in a chassis of the vehicle and configured to accommodate at least one wheel, wherein the crush structure is configured to absorb mechanical energy during an impact with an object;
at least one sensor configured to sense the impact with the object; and
a controller configured to receive information from the at least one sensor and to determine an approximate location and an approximate angle of impact with the object based on the information received from the sensor, the controller being further configured to selectively signal the actuator to cause the crush structure to move relative to the vehicle structure, wherein the controller is further configured to cause the crush structure to approximately axially align with the approximate angle of impact with the object.

2. The system of claim 1, further comprising:
a pivot coupled to one end of the crush structure and the actuator coupled proximate the other end of the crush structure.

3. The system of claim 1, wherein a first actuator is coupled proximate one end of the crush structure and a second actuator is coupled proximate the other end of the crush structure.

4. The system of claim 1, wherein the at least one sensor includes at least one sensor chosen from a LIDAR sensor, a RADAR sensor, an ultrasonic sensor, an infrared sensor, a radiofrequency sensor, and a camera sensor.

5. The system of claim 1, wherein the controller is further configured to cause one end of the crush structure to move proximate the approximate location of impact on the vehicle.

6. A vehicle comprising:
a chassis;
at least one wheel coupled to the chassis;
a wheel clearance zone formed in the chassis and configured to accommodate the at least one wheel;
a crush structure located in the wheel clearance zone and configured to absorb mechanical energy during an impact with an object; and
a system including:
at least one actuator coupled to the crush structure and coupled to a portion of the vehicle;
at least one sensor configured to sense impact with the object; and
a controller configured to receive information from the at least one sensor and to determine a location and angle of impact based on the information received from the sensor, the controller being further configured to selectively signal the actuator to cause the crush structure to move relative to the vehicle structure in direction and angle related to the determined location and angle of impact.

7. The vehicle of claim 6, further comprising:
a pivot coupled to one end of the crush structure and the actuator coupled proximate the other end of the crush structure.

8. The vehicle of claim 6, wherein a first actuator is coupled proximate one end of the crush structure and a second actuator is coupled proximate the other end of the crush structure.

9. The vehicle of claim 6, wherein the controller is further configured to determine an approximate angle of impact with the object and to cause the crush structure to approximately axially align with the approximate angle of impact with the object.

10. The vehicle of claim 6, wherein the controller is further configured to determine an approximate location of impact on the vehicle and to cause one end of the crush structure to move proximate the approximate location of impact on the vehicle.

11. The vehicle of claim 6, wherein the at least one sensor includes at least one sensor chosen from a LIDAR sensor and a RADAR sensor.

12. The vehicle of claim 6, wherein the at least one sensor includes at least one sensor chosen from an ultrasonic sensor, an infrared sensor, and a camera sensor.

13. A method comprising:
determining, by an impact sensor on board a vehicle, that the vehicle will impact an object with a high probability;
determining, by a controller, an approximate impact site on the vehicle;
determining, by the controller, an approximate impact angle on the vehicle; and
deploying, responsive to command of the controller, a crush structure with at least one end of the crush structure proximate the approximate impact site and at an angle approximating the approximate impact angle, wherein the crush structure is located in a wheel clearance zone formed in a chassis of the vehicle and configured to accommodate at least one wheel, wherein the crush structure is configured to absorb mechanical energy during the determined impact.

* * * * *